M. M. DESSAU.
APPARATUS FOR REMOVING FOREIGN MATTER FROM INDIA RUBBER, GUTTA PERCHA, BALATA, AND THE LIKE.
APPLICATION FILED NOV. 23, 1909.
960,846.
Patented June 7, 1910.
2 SHEETS—SHEET 1.
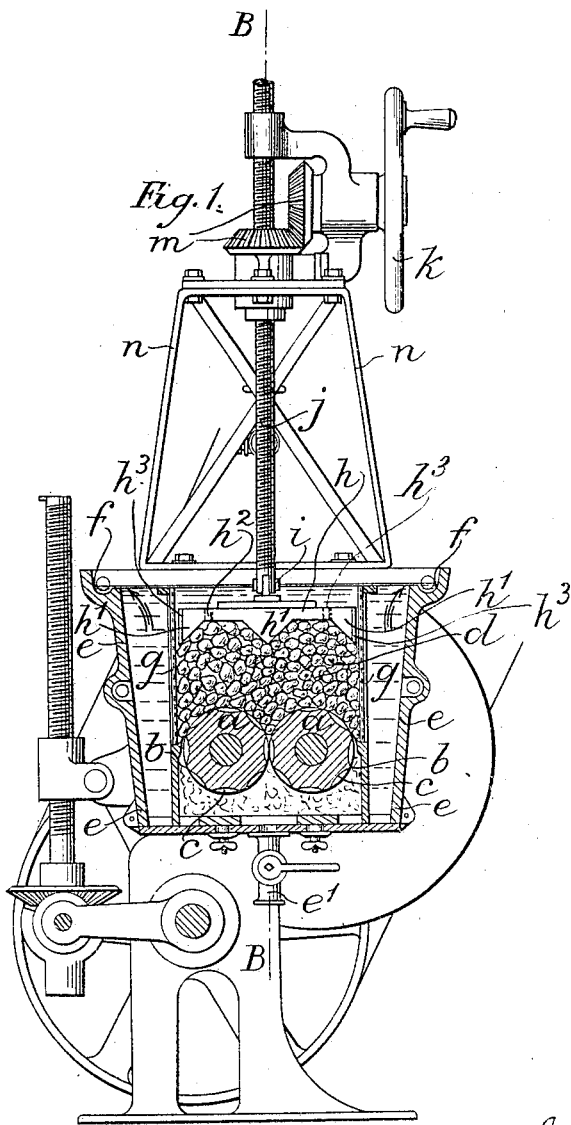

M. M. DESSAU.
APPARATUS FOR REMOVING FOREIGN MATTER FROM INDIA RUBBER, GUTTA PERCHA, BALATA, AND THE LIKE.
APPLICATION FILED NOV. 23, 1909.
960,846.
Patented June 7, 1910.
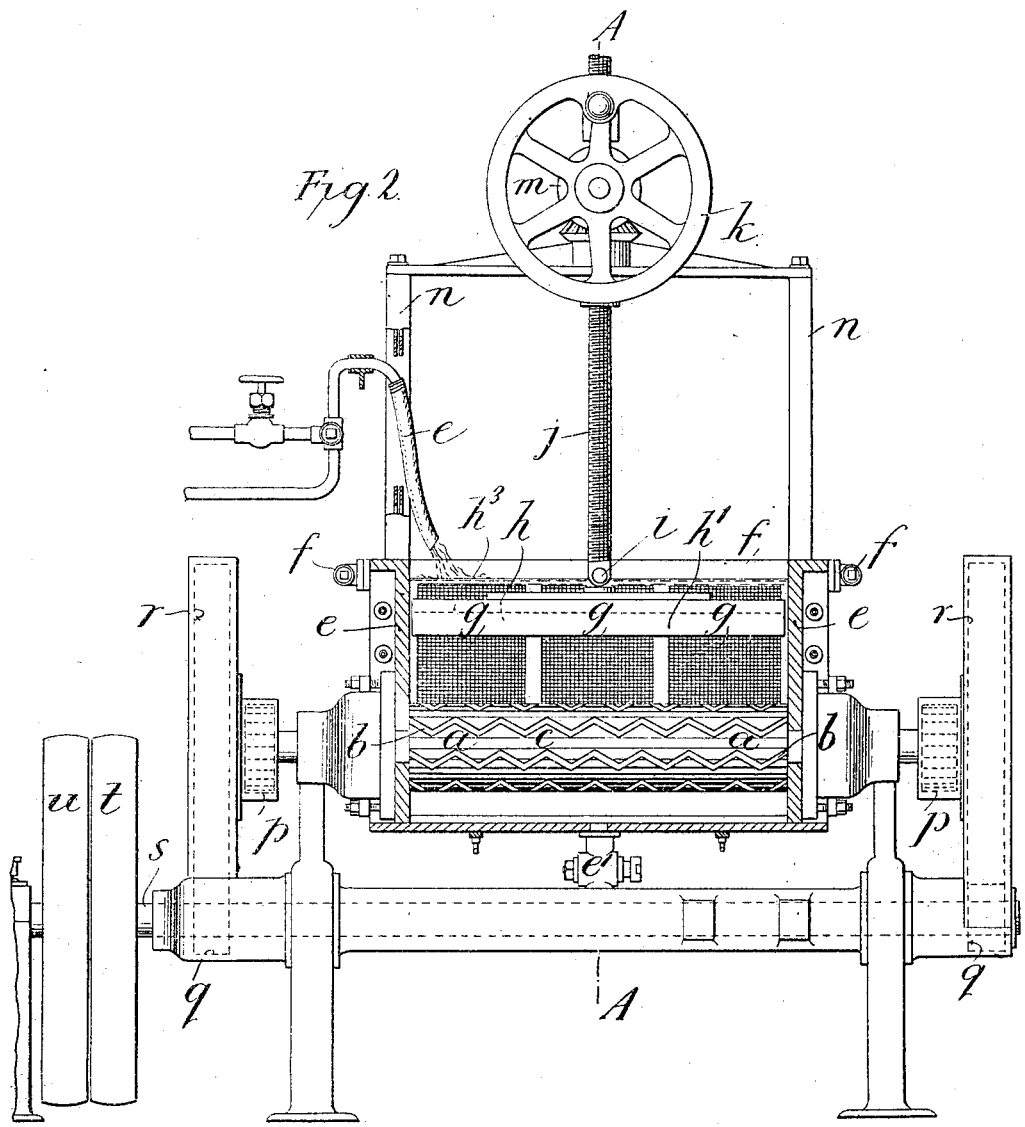

UNITED STATES PATENT OFFICE.

MORLAND MICHOLL DESSAU, OF LONDON, ENGLAND.

APPARATUS FOR REMOVING FOREIGN MATTER FROM INDIA-RUBBER, GUTTA-PERCHA, BALATA, AND THE LIKE.

960,846.     Specification of Letters Patent.     Patented June 7, 1910.

Application filed November 23, 1909. Serial No. 529,564.

*To all whom it may concern:*

Be it known that I, MORLAND MICHOLL DESSAU, a citizen of the United States of America, residing in the county of London, England, have invented Improvements in Means or Apparatus for Removing Foreign Matter from India-Rubber, Gutta-Percha, Balata, and the Like, of which the following is a specification.

This invention relates to improvements in the removal of foreign matter from crude india rubber, gutta percha, balata and the like, (hereinafter included in the term india rubber) by subjecting the same to the action of rolls in the presence of water or other liquid, whereby the impurities are either liberated or washed out.

The object of the present invention is to reduce the time occupied in removing the impurities and to simplify the feeding of the india rubber to the rolls. For this purpose the india rubber is fed to the rolls under the continuously applied pressure of a rockable platen, movement of which causes the washing water or liquid to surge in such manner that the impurities are rapidly washed out and removed with the overflow water or liquid while suspended therein.

The accompanying drawings illustrate a machine according to the present invention intended for use with water, Figure 1 being an elevation partly in section on the line A A of Fig. 2, and Fig. 2 an elevation, also partly in section, on the line B B of Fig. 1.

As there shown, each roll $a$ is formed with a series of sinuous crests $b$ and consequent intervening indentations $c$, constituting a highly roughened or toothed surface which experiment has shown not only more effectually deforms the blocks or pieces of crude india rubber $d$ than hitherto, as they pass between the rolls, so as to open out the india rubber and liberate solid impurities, such as stones and sand, therefrom, but also so agitates the blocks or pieces aforesaid as to oscillate the platen or plunger to be hereinafter described and produce a surging action of the water on its way to the trough $e$ so that the impurities or lighter impurities are not allowed to settle in the trough as formerly, or not to so great an extent, but are caused to move with the overflow water in the direction of the arrows (Fig. 1) for removal at the gutters $f$. Any impurities not so removed but collecting in the bottom of the trough $e$ below the rolls $a$ can be discharged from time to time, as heretofore, through a discharge valve $e^1$.

Perforated screens, as ordinarily, are arranged at $g$ to prevent the rubber $d$ which has passed the rolls $a$ entering the trough $e$, which rubber is carried around by the rolls to be again operated upon.

The feeding of the blocks or pieces of crude india rubber under pressure to the rolls is effected by means of a platen or plunger $h$ which is jointed at $i$ to the lower extremity of a screwed spindle $j$ that can be adjusted vertically by the hand wheel $k$, and gearing $m$, the joint at $i$ being such as to allow the platen $h$ to oscillate about the same and accommodate itself, to a limited extent, to variation in level of the rubber $d$ lengthwise of the rolls $a$, that is to say, the axis of the joint is arranged transversely to the said rolls. The spindle $j$ and operating mechanism $k$, $m$ are shown as carried by a frame $n$ from the top of the machine, and the platen or plunger $h$ is shown in its preferred form in which its underside is provided with ridges $h^1$ arranged to approach the curved surfaces of the rolls $a$ and assist in guiding the rubber over and between the rolls. In other respects the machine is or may be the same as formerly constructed. As will be obvious, the platen or plunger $h$ may be of any other desired contour or shape in cross section, so as to provide an uneven or a flat surface at the underside as may be required. The platen or plunger $h$ also may be perforated, as shown at $h^2$, and may be provided at its edges with strips $h^3$ of india rubber fitting the sides of the trough $e$, so as to confine the rubber while at the same time permitting a rise and fall of the platen or plunger. $o$ is a pipe for supplying water to the trough $e$. After completion of its treatment, the rubber is removed from above the rolls $a$, the platen $h$ being withdrawn from the trough to enable this to be done.

The device for moving the platen instead of being operated by hand power, as shown, may if desired be operated by other power.

The rolls $a$ are geared together at their ends by toothed wheels $p$ and one of them is driven at each end through gearing $q$, shown in guard casings $r$, from a driving shaft $s$ provided with fast and loose pulleys $t$ and $u$ respectively.

The invention can be applied in connection with rubber washing machines of various constructions.

What I claim is:—

1. A machine for separating foreign matter from indiarubber, comprising a liquid container, a pair of lacerating rolls therein arranged to rotate about parallel axes in a substantially horizontal plane so that the indiarubber being treated can pass vertically downward between their peripheries, and a platen pivotally supported above the rolls so that it can oscillate about an axis transverse to the axes of the rolls, the said platen being adapted to continuously apply pressure to the indiarubber and oscillate about its pivotal support to produce a surging of liquid in the container.

2. A machine for separating foreign matter from indiarubber, comprising a liquid container, a pair of lacerating rolls therein arranged to rotate about parallel axes in a substantially horizontal plane so that the indiarubber being treated can pass vertically downward between their peripheries, a platen adapted to continuously apply pressure to the indiarubber, a support for the platen having a joint with its axis arranged transversely to the rolls for enabling the platen to oscillate and produce a surging of liquid in the container, and means for advancing the platen support toward and withdrawing the same from the rolls.

3. A machine for separating foreign matter from indiarubber comprising a liquid container, screens dividing the container into a central and side compartments, a pair of lacerating rolls in the central compartment arranged to rotate about parallel axes in a substantially horizontal plane so that the indiarubber can pass vertically downward between their peripheries, a platen adapted to continuously apply pressure to the indiarubber, a support for the platen having a joint with its axis arranged transversely to the rolls, enabling the platen to oscillate and produce a surging of liquid through the screens into the side compartments of the container, and overflow gutters for conducting liquid from the said side compartments.

4. A machine for separating foreign matter from india rubber, comprising a trough, screens dividing the trough into a central and side compartments, lacerating rolls having highly roughened surfaces arranged in the said central compartment, overflow gutters for the side compartments, a platen adapted to oscillate and to act upon india rubber placed in the central compartment upon the rolls, and means for rotating the rolls in opposite directions so that the india rubber is caused to repeatedly pass through the rolls and in so doing oscillate the platen to produce a surging of liquid fed into the trough, from the central compartment to the side compartments through the screens for the purpose set forth.

Signed at London, England this 12th day of November 1909.

MORLAND MICHOLL DESSAU.

Witnesses:
F. L. RAND,
H. D. JAMESON.